(12) United States Patent
Slatter

(10) Patent No.: US 7,855,646 B2
(45) Date of Patent: Dec. 21, 2010

(54) INDUCTIVE COUPLING IN DOCUMENTS

(75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 11/718,236

(22) PCT Filed: Sep. 27, 2005

(86) PCT No.: PCT/EP2005/054830

§ 371 (c)(1),
(2), (4) Date: Mar. 3, 2008

(87) PCT Pub. No.: WO2006/045682

PCT Pub. Date: May 4, 2006

(65) Prior Publication Data

US 2008/0169905 A1    Jul. 17, 2008

(30) Foreign Application Priority Data

Oct. 29, 2004    (GB)    .................. 0424158.4

(51) Int. Cl.
*G08B 13/14*    (2006.01)
(52) U.S. Cl. ................ 340/572.7; 283/81; 283/82; 283/83
(58) Field of Classification Search ............. 340/572.7; 343/742, 744, 867
See application file for complete search history.

(56) References Cited

U.S. PATENT DOCUMENTS

| 5,608,417 | A | * | 3/1997 | de Vall | 343/895 |
| 5,955,723 | A | * | 9/1999 | Reiner | 235/492 |
| 2002/0008690 | A1 | * | 1/2002 | Cooper | 345/156 |
| 2004/0069856 | A1 | | 4/2004 | Held et al. | |
| 2004/0100382 | A1 | * | 5/2004 | Waters | 340/568.1 |

FOREIGN PATENT DOCUMENTS

| EP | 1076316 A2 | 2/2001 |
| EP | 1393927 A1 | 3/2004 |
| GB | 2397272 A1 | 7/2004 |
| JP | 2003218624 | 7/2003 |
| WO | 01/90849 A2 | 11/2001 |
| WO | 02/48980 A1 | 6/2002 |
| WO | 2003100721 A1 | 12/2003 |

* cited by examiner

*Primary Examiner*—Brian A Zimmerman
*Assistant Examiner*—Sara Samson

(57) ABSTRACT

Inductive Coupling in Document 5 A document comprises a substrate. The substrate comprises a coupling circuit having conductive tracks printed on the substrate. The coupling circuit comprises a first coupling part (40) for coupling to a memory tag (14) and of a size to receive a memory tag within the first coupling part, a second coupling (41) part for coupling to a reader, the first coupling part being smaller than the second coupling part, and a connecting part (42) to connect the first coupling part and the second coupling part.

12 Claims, 5 Drawing Sheets

INDUCTIVE COUPLING IN DOCUMENTS

Related Applications

The present application is based on PCT/EP2005/054830 filed Sep. 27, 2005 and claims priority from Great Britain Application Number 0424158.4, filed Oct. 29, 2004, the disclosures of which are hereby incorporated by reference herein in their entirety.

FIELD OF THE INVENTION

This invention relates to a document comprising a substrate where the substrate has a coupling circuit, and a method of providing such a document.

BACKGROUND OF THE INVENTION

Transponder devices in the form of Radio Frequency Identification (RFID) tags are well known in the prior art. RFID tags come in many forms but all comprise an integrated circuit on which in use data can be stored and a coil which enables it to be interrogated by a reader which also powers it by means of an inductive (wireless) link. One use to which such transponder devices can be put is the annotation of items, such as documents, with data over and above that printed on them. For example in EP 1 076 316 A2 Eastman Kodak Company describe the use of an RFID tag of conventional form secured to a print, being an output image on a substrate, possibly of a photograph.

To communicate with such transponder devices, it is necessary for the tag to have an appropriate antenna to provide inductive coupling with the reader. It is known to provide a RFID tag on a flexible substrate with a metallic antenna provided on the substrate and connected to the tag which may be attached to other documents. for example from U.S. Pat. No. 6,019,865. Such a process can be inappropriate for some applications, and it is known from W/O10/18749 to provide a label in which an antenna circuit is provided by printing a circuit on a substrate using a conductive toner and the RFID tag is located on the label such that conductive pins on the tag pierce or engage the printed antenna circuit. This however may be disadvantageous because of the problems of forming a reliable electrical contact between the conductive pins of the RFID tag and the antenna circuit.

SUMMARY OF THE INVENTION

According to an aspect of the invention we provide a document comprising a substrate, the substrate comprising a coupling circuit having conductive tracks printed on the substrate, the coupling circuit comprising a first coupling part for coupling to a memory tag, second coupling part for coupling to a reader, the first coupling part being smaller than the second coupling part and a connecting part to connect the first coupling part and the second coupling part.

BRIEF DESCRIPTION OF THE DRAWINGS

Some embodiments of the invention will now be described by way of example with reference to the accompanying drawings in which.

DETAILED DESCRIPTION OF THE PREFERRED EMBODIMENTS

Figure 1:
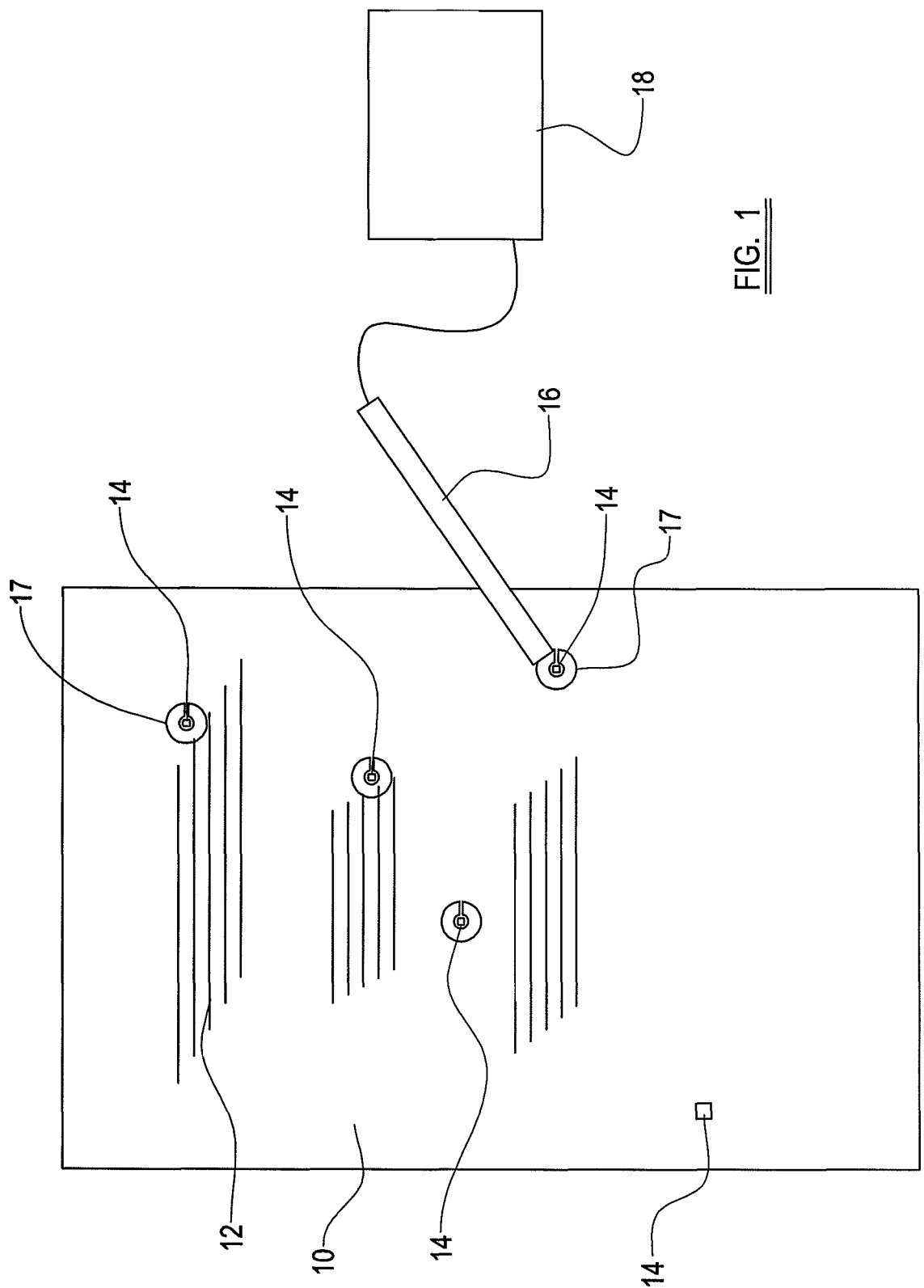
FIG. 1 illustrates a document providing an embodiment of the present invention.

FIG. 1 illustrates an document comprising a substrate, in this example a sheet of paper 10, bearing printing 12, which has been annotated with electronic data using a plurality of memory tags 14. The memory tags 14 have been secured to the sheet of paper 10 at various locations over its surface, although they may alternatively be embedded in the paper sheet 10, preferably in locations identified by the printing 12, in order to assist in locating them for the purposes of reading data from or writing data to the memory tags 14. Each memory tag has a coupling circuit 17 associated therewith, as will be discussed in more detail below.

In this description, 'memory tag' refers to a transponder device having a memory in which data is stored and where the transponder device is readable via and powered by a radio frequency wireless communication link, in the present example through inductive coupling. The term 'message tag' may thus include, but is not limited to, read only RFID tags of known type and transponder devices with a memory which may be read from and written to.

A hand held read/write device 16 is used to communicate with the memory tags 14 in wireless manner, as will be discussed further below. The read/write device 16 is also connected to a host computer, display, data rendering device or other apparatus 18 from which the data for writing to the memory tags 14 is received, and/or the data read from the memory tags 14 is passed.

Figure 2:
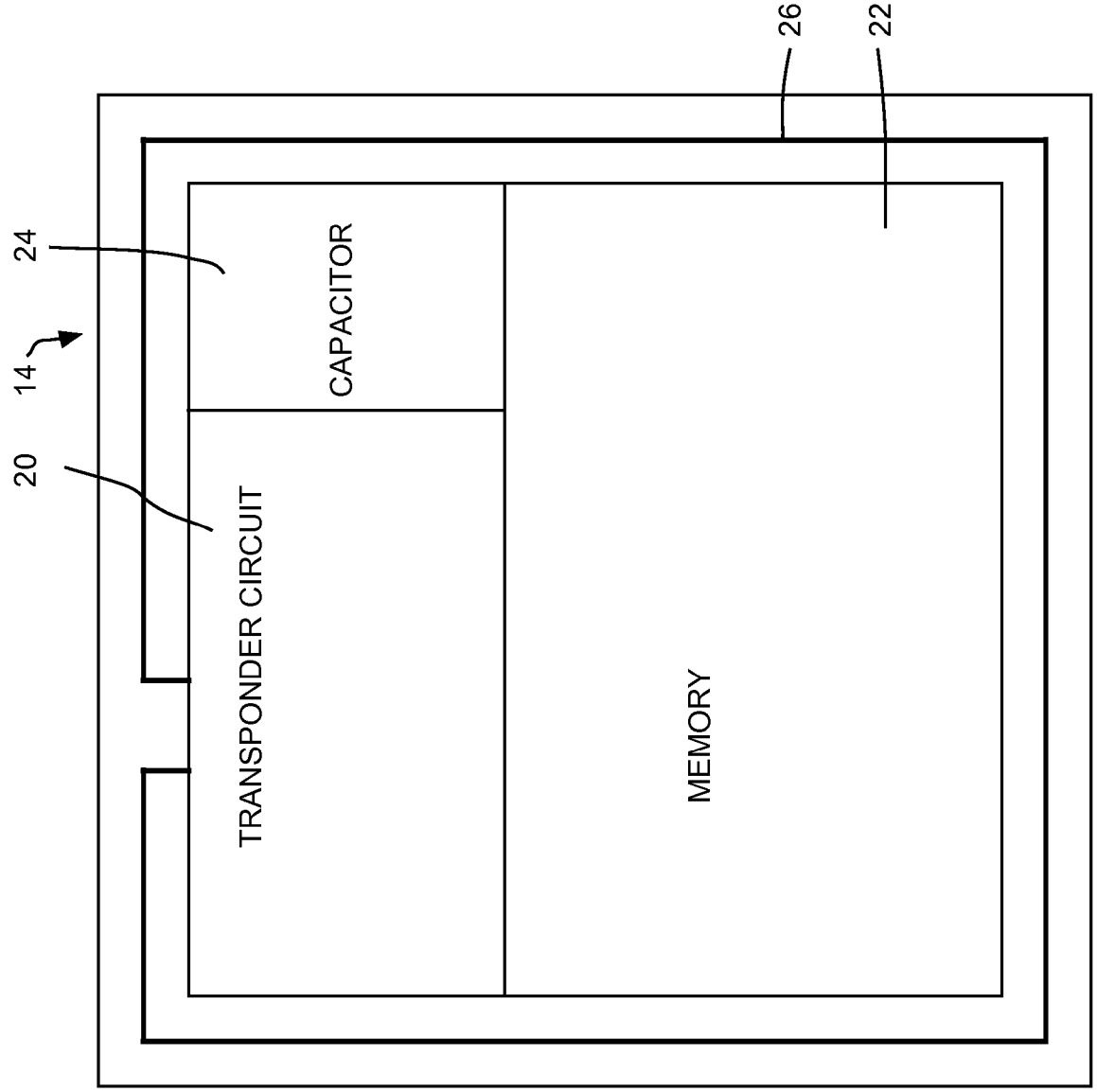
FIG. 2 illustrates a prior art memory tag suitable for use in the document of FIG. 1.

Referring now to FIG. 2, a schematic of a memory tag 14 is shown. The memory tag 14 is an memory tag provided on a chip, and comprises an transponder circuit 20, a memory 22, a power supply capacitor 24 and an antenna coil 26 having only a few turns e.g. five, or as in this case a single turn. The transponder circuit 20 operates at 2.45 GHz, is of an area of approximately 0.5 mm$^2$, and will be described further below. The memory 22 provides 1 Mbit of capacity of non-volatile memory and is of an area of approximately 1 mm$^2$, and uses FRAM (ferroelectric random access memory) or MRAM (magnetoresistive random access memory) or similar memory technology requiring low power. The memory tags 14 are of a substantially square shape in plan view with an external dimension D for their sides of around 1 mm.

Figure 3:
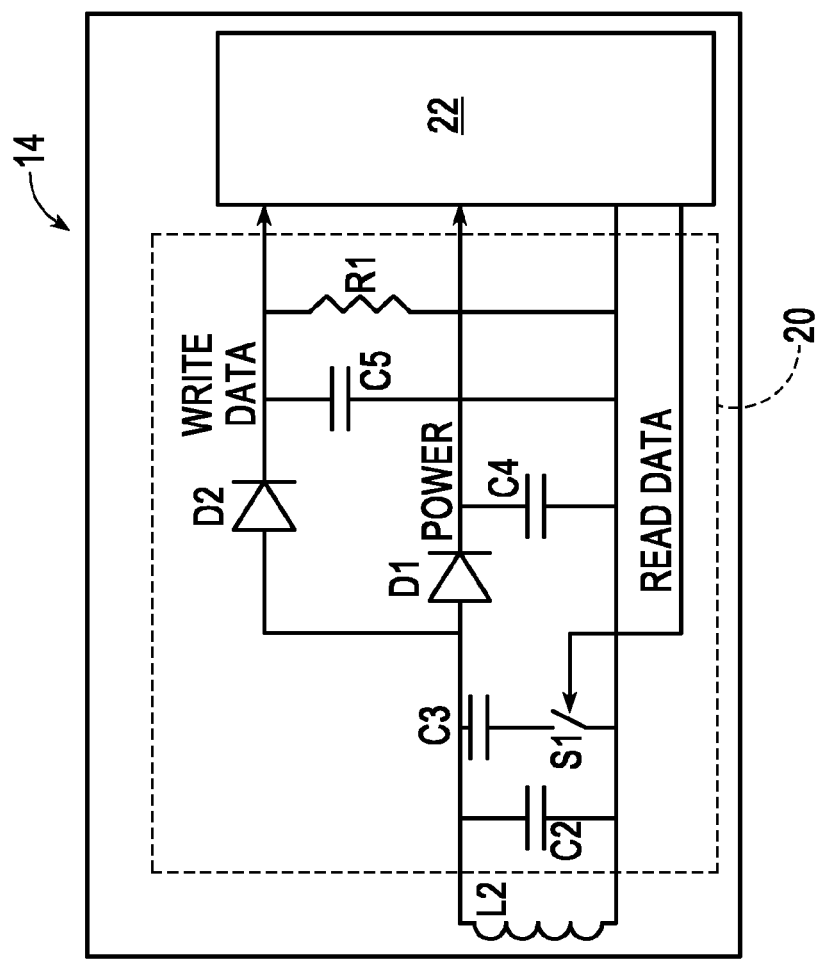
FIG. 3 illustrates the circuitry of the memory tag of FIG. 2 and of a read/write device for wireless communication with the memory tag.
Figure 3:
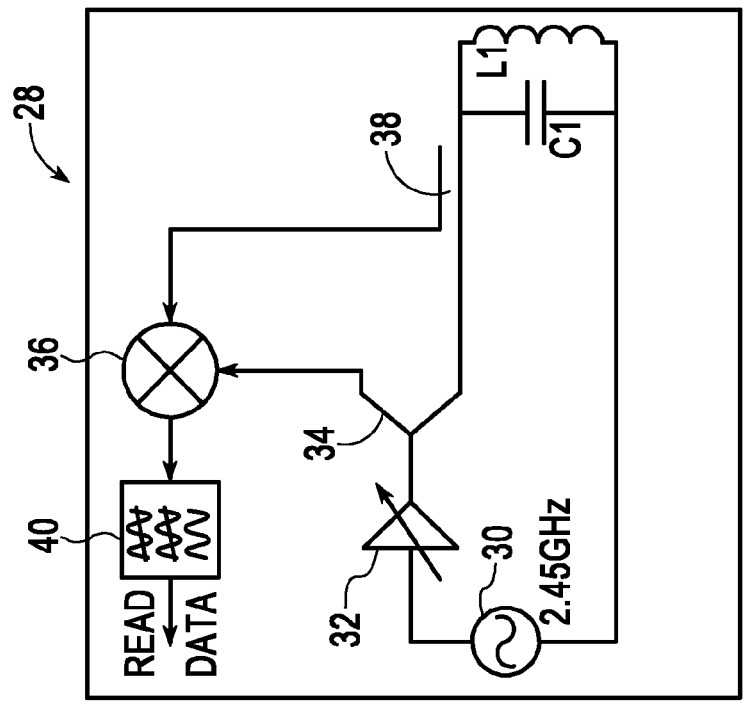

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read/write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 28 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the read/write device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and read/write device 16 described above power transfer of around 25% can be achieved with a distance of around 1.8 mm between the antennae L1 and L2, of the read/write device 16 and memory tag 14 respectively. This is sufficient to transfer enough power to the memory tag 14 for it to operate.

The memory tags 14 have an external dimension D of around 1 mm, as described above, and therefore the read/write device 16 can communicate with them over a relatively short range, in this example of approximately 2D.

Figure 4:
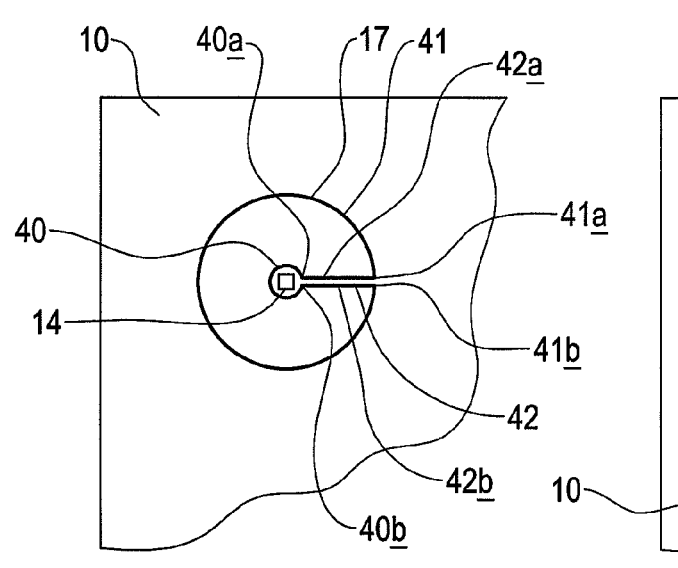
FIG. 4 shows a part of the document of FIG. 1 on a larger scale.

To permit the read/write device 16 to communicate with the memory tag 14 over a longer distance a coupling circuit 17 is provided as shown in more detail in FIG. 4. The coupling circuit 17 comprises a first, relatively small coupling part 40, a second, relatively large coupling part 41, and a connecting part 42 connecting the first coupling part 40 and second coupling part 41. In this example, the first coupling part 40 and the second coupling part 41 are almost complete circles, the inner coupling part ending at a first end part 40a and a second end part 40b. The second coupling part 41 likewise ends at a first end part 41a and a second end part 41b. The coupling comprises a first line 42a extending between the first end parts 40a, 41a and a second line 42b extending between the second end parts 40b, 41b. In the present example, the first coupling part 40 has a diameter of about 2D or 2 mm, while the second coupling part 41 has a diameter of about 5 to 15 mm, on this example about 10 mm. The diameter of the first coupling part 40 is selected such that a memory tag 40 can be located within the first coupling part 40 with a relatively small distance between the memory tag 14 and the first coupling part 40 to ensure good coupling between the first coupling part 40 and the antenna 26 on the memory tag 14.

The coupling circuit 17 is provided by printing an appropriately conductive line on the substrate 10. The conductive tracks making up the coupling circuit 17 may be printed using an appropriate material as desired, for example using a conductive toner which includes metallic powders in an appropriate medium in known manner.

Figure 5:
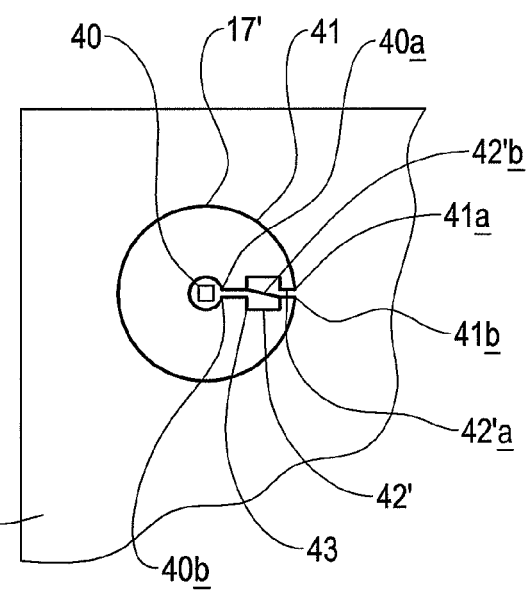
FIG. 5 shows a part of a document having a further coupling circuit providing an embodiment of the present invention.

Referring now to FIG. 5, a further coupling circuit 17' is shown. In the coupling circuit 17', the first coupling part 40 and second coupling part 41 are the same as those shown in the embodiment of FIG. 4. In this example however, a coupler 42' includes a cross over, such that opposite end parts 40a and 41b are corrected and end parts 40b and 41a are connected. This is formed by printing a first track 42'a on the substrate 10, printing a non-conductive layer 43 over the track 42a and subsequently printing a second track 42'b over the non-conductive layer 43. By providing this crossover in the coupler 42, the direction of magnetic flux in the first and second coupling parts 40, 41 will be directed in the same direction, and not in opposing and thus partially cancelling directions as in the circuit of FIG. 4.

Figure 6A:
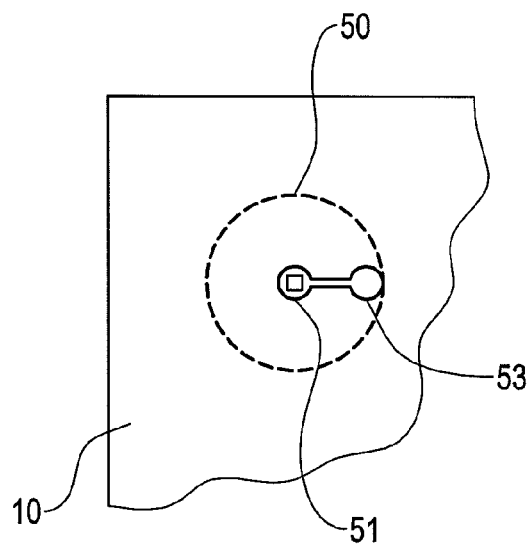
FIG. 6a shows a part of a document having a yet further coupling circuit providing an embodiment of the present invention.
Figure 6B:
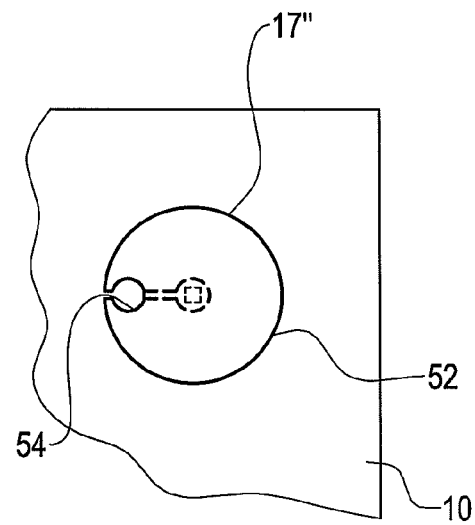
FIG. 6b shows a reverse side of the document of FIG. 6a, FIG. 7 shows a part of a document having another coupling circuit providing an embodiment of the present invention.

The first coupling part and second coupling part need not be printed with the layout as shown or even on the same side of the paper, and where appropriate there need not be direct electrical connection between the first coupling part and the second coupling part. For example, a further coupling circuit 50 is shown in FIGS. 6a and 6b in which a first coupling part 51 is printed on one side of the paper 10 and a second coupling part 52 is printed on the opposite side of the paper 10. The first coupling part 51 and second coupling part 52 are the same size as the first coupling part 40 and second coupling part 41 of FIGS. 4 and 5. The connecting part comprises a first coupling loop 53 connected to the first coupling part and a second coupling loop 54 connected to the second coupling part 52. The coupling loops 53, 54 are printed on opposite sides of the paper such that they substantially overlie one another to provide inductive coupling there between and thus coupling the first coupling part 51 and second coupling part 52.

Figure 7:
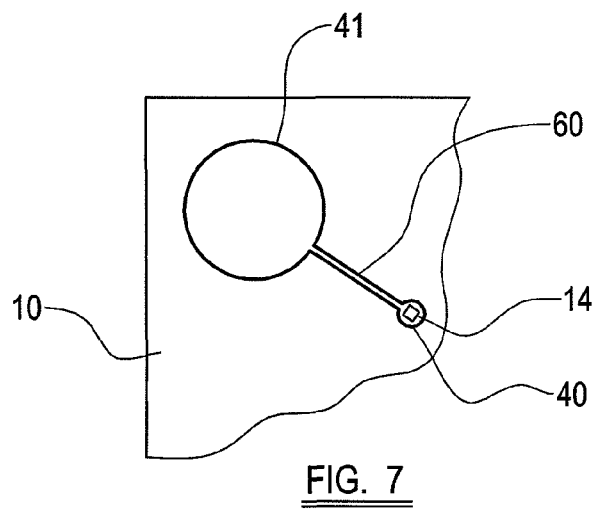
Figure 8:
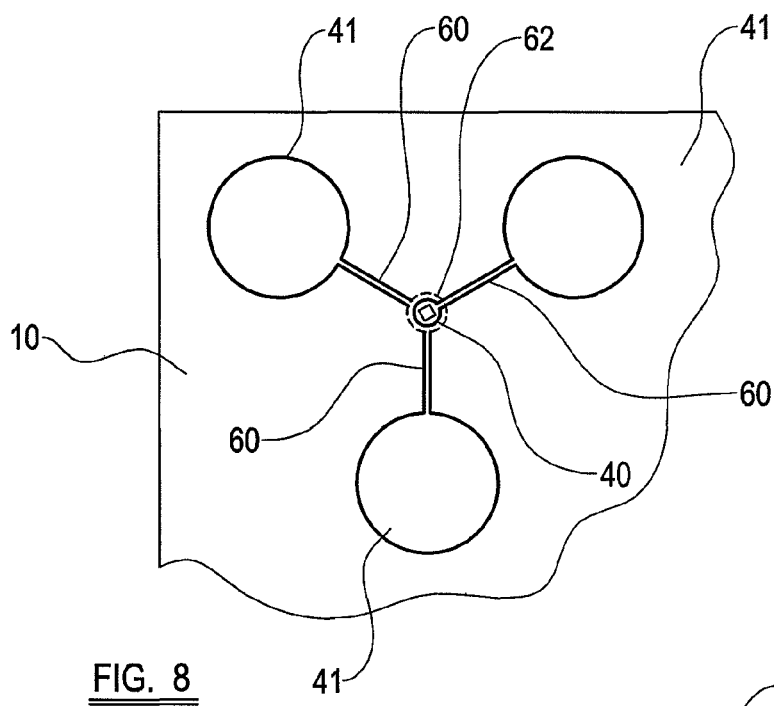
FIG. 8 shows a part of a document having a another coupling circuit providing an embodiment of the present invention.
Figure 9:
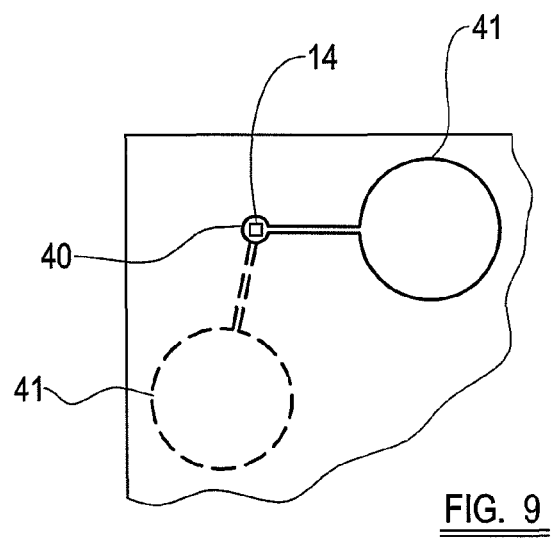
FIG. 9 shows a part of a document having another coupling providing an embodiment of the present invention.

Other arrangements of the coupling circuit may be provided. For example, as show in FIG. 7 the first coupling part 40 and second coupling part 41 are laterally spaced from one another and connected by an elongate connecting part 60. This may be appropriate where it is desirable for a reader to always read the same part of a document while permitting the memory tag 14 to be placed elsewhere on the substrate 10. In FIG. 8, a plurality of similar circuits are provided with the first coupling parts 40 overlying one another and the second coupling parts 41 spaced from another. The first coupling parts may be separated by insulating layers 62 as discussed above. The plurality of coupling circuits thus permit the memory tag 14 to be addressed by a reader located at one of a plurality of different locations on the substrate 10. In an alternative shown in FIG. 9, one of the plurality of coupling circuits is provided on one side of the substrate 10 and another of plurality of coupling circuits is provided on the other side of the substrate 10, such that the first coupling parts 40 overlie one another and the second coupling parts 41 are laterally spaced without having to provide an insulating layer 62.

The first coupling part, second coupling part and connecting part may be arranged in other configurations than those shown herein. The first and second coupling part may not be substantially circular, nor indeed necessarily concentric and may consist of more than one loop if required. Where the document is to use a memory tag of a different size from that described herein, the size of the first and second coupling parts may be adapted accordingly. The provision of the second coupling part provides a larger area within which the tip of the read/write device 16 may be located to provide communication with the memory tag 14, thus reducing the degree of precision required. Where the conductive tracks forming the coupling circuit 17 are of a transparent material, it will be apparent that the coupling circuit may be printed on the substrate 10 over visible conventional printing, or indeed may be printed over if appropriate.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although in this example the substrate 10 comprises a sheet of paper, it will be apparent that the substrate 10 may be any surface or element on which the coupling circuit may be provided. The substrate 10 may for example comprise plastic or cardboard. It might even be envisaged that the substrate 10 be a rigid surface, such as part of a permanent display.

By providing the coupling circuit 17, the area of the substrate 10 over which coupling occurs between the read/write device 16 and the memory tag 14 is increased. A user will not have to position the read/write device with the same accuracy as if the coupling circuit 17 was not present, thus providing easier use of the read/write device 16. The coupling circuit 17 may also permit a document to be provided with 'hot spots' or specific areas of actuation. The area of actuation may be indicated by printing on the substrate 10, for example a box or a specific block of text, or even an illustration such as a cartoon character, such that placing the tip of the read/write device 16 with the area of actuation reads the corresponding memory tag 14.

Although the memory tags 14 described above operate at 2.45 GHz it should be understood that memory tags operating at other frequencies may be used to implement the invention. Factors affecting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

The invention claimed is:

1. A document comprising a substrate,
   the substrate comprising a coupling circuit having conductive tracks printed on the substrate,
   the coupling circuit comprising
      a first coupling part for coupling to a memory tag and of a size to receive a memory tag within the first coupling part,
      a second coupling part for coupling to a reader, the first coupling part being smaller than the second coupling part, and
      an inductive coupling part to inductively connect the first coupling part and the second coupling part;
   wherein the inductive coupling part comprises a first coupling loop connected to the first coupling part and a second coupling loop connected to the second coupling part, and wherein the first coupling loop and second coupling loop are inductively coupled.

2. A document according to claim 1 wherein the first coupling part is substantially circular.

3. A document according to claim 2 wherein the first coupling part has a diameter of about 2mm.

4. A document according to claim 1 wherein the second coupling part is substantially circular.

5. A document according to claim 4 wherein the second coupling part has a diameter in the range 5 mm to 15 mm and preferably about 10 mm.

6. A document according to claim 1 wherein the first coupling part and the first coupling loop are printed on one side of the substrate and wherein the second coupling part and second coupling loop are printed on the other side of the substrate.

7. A document according to claim 1 wherein the first coupling part is laterally spaced from the second coupling part.

8. A document according to claim 1 comprising a plurality of coupling circuits, wherein the first coupling parts of each coupling circuit overlie one another and wherein where the second coupling parts of each coupling circuit are spaced from one another.

9. A document according to claim 8 wherein one of said plurality of coupling circuits is provided on one side of the substrate and another of plurality of coupling circuits is provided on the other side of the substrate.

10. A document according to claim 1 comprising a memory tag located within the first coupling part.

11. A method of providing a document comprising:
   providing a substrate; and
   printing conductive tracks on the substrate to form a coupling circuit, including:
      printing a first coupling part and a first coupling loop connected to the first coupling part on a front side of the substrate, the first coupling part for coupling to a memory tag, and
      printing a second coupling part and a second coupling loop connected to the second coupling part on a back side of the substrate;
   wherein the first coupling loop and the second coupling loop are inductively coupled.

12. A method of providing a document, the method comprising:
   providing a substrate;
   printing conductive tracks on the substrate to form a plurality of coupling circuit, each coupling circuit comprising
      a first coupling part for coupling to a memory tag,
      a second coupling part for coupling to a reader, the first part being smaller than the second part, and
      a connecting part to connect the first coupling part and the second coupling part; and
   attaching a plurality of memory tags to the substrate, each memory tag being coupled to a first coupling part of an associated coupling circuit;
   wherein printing conductive tracks on the substrate comprises:
      printing a first line to connect a first end of the first coupling part to a first end of the second coupling part,
      providing a non-conducting layer over the first line, and
      printing a second line to connect a second end of the first coupling part to a second end of the second coupling part;

wherein the second line is printed over the non-conducting layer to provide a crossover wherein the first line crosses the second line; and, wherein the first coupling part and a first coupling loop connected to the first coupling part are on a front side of the substrate and a second coupling part and a second coupling loop connected to the second coupling part are on a back side of the substrate.

* * * * *